United States Patent [19]

O'Neill et al.

[11] 3,756,608

[45] Sept. 4, 1973

[54] AUTOMATIC CASSETTE CHANGER

[75] Inventors: Jerry G. O'Neill, Northridge; Terrance M. Loy, Santa Monica; Harry Roger Swanson, Canoga Park, all of Calif.

[73] Assignee: Data Instruments Company, Sepulveda, Calif.

[22] Filed: Mar. 18, 1970

[21] Appl. No.: 20,587

[52] U.S. Cl. .......... 274/4 F

[51] Int. Cl. .......... G11b 23/10

[58] Field of Search .......... 274/4, 11; 214/6.2

[56] References Cited

UNITED STATES PATENTS

| | | | |
|---|---|---|---|
| 3,658,193 | 4/1972 | Gross | 274/4 F |
| 3,589,733 | 6/1971 | Piotrowski | 274/4 F |
| 3,620,385 | 11/1971 | Vermeijlen | 274/4 F |
| 3,578,262 | 5/1971 | Mandell | 274/11 C |
| 3,494,572 | 2/1970 | Uemura | 274/11 C |
| 2,744,372 | 5/1956 | Cleaveland et al. | 214/6.2 |
| 3,421,638 | 1/1969 | Locke et al. | 214/6.2 |
| 1,278,523 | 9/1918 | Trew | 214/6.2 |
| 3,291,323 | 12/1966 | Pastor et al. | 274/4 F |
| 3,477,726 | 11/1969 | Laschenski | 274/4 F |

FOREIGN PATENTS OR APPLICATIONS

| | | | |
|---|---|---|---|
| 1,939,432 | 2/1970 | Germany | 274/4 F |

*Primary Examiner*—Harry N. Haroian
*Attorney*—Spensley, Horn & Lubitz

[57] ABSTRACT

An automatic cassette or magazine changer for automatically placing and removing cassettes or magazines onto and from a tape recorder is disclosed. The cassettes are lowered and lifted one at a time onto and from the tape recorder by means of a vertically moving platform. A pusher which moves horizontally urges the cassettes from the platform into a discharge hopper once a cassette has been lifted above the tape recorder's drive shafts and guide pins by the platform. The cassettes are stacked in the discharge hopper in the order in which they are played with the first cassette played being the top cassette in the stack.

13 Claims, 11 Drawing Figures

JERRY G. O'NEILL
TERRANCE M. LOY
HARRY ROGER SWANSON
INVENTORS

BY Spensley & Horn
ATTORNEY

JERRY G. O'NEILL
TERRANCE M LOY
HARRY ROGER SWANSON
INVENTORS

BY Spensley & Horn
ATTORNEY

JERRY G. O'NEILL
TERRANCE M. LOY
HARRY ROGER SWANSON
INVENTORS

BY Spensley & Horn
ATTORNEY

JERRY G. O'NEILL
TERRANCE M. LOY
HARRY ROGER SWANSON
INVENTORS

BY Spensley & Horn
ATTORNEYS

AUTOMATIC CASSETTE CHANGER

BACKGROUND OF THE INVENTION

1. Field of the Invention

The invention relates to automatic cassette or magazine changer for use with a tape recorder or playback means.

2. Prior Art

The inventors are aware of only one other automatic cassette or magazine changer not manufactured by the assignee of the present application. That particular changer is not readily adaptable for heavy duty or industrial use since it is not sufficiently rugged and does not possess the features required for such use, particularly data processing applications.

SUMMARY OF THE INVENTION

An automatic cassette or magazine changer is described which is adaptable for successively placing cassettes or magazines onto and removing them from a tape recorder. The cassettes are initially contained in an input hopper mounted above the tape recorder. A vertically movable cassette platform lowers cassettes from the input hopper onto the tape recorder. When a cassette is to be removed from the tape recorder, the cassette platform lifts the cassette from the recorder allowing the cassette to disengage the mechanisms of the tape recorder and a pusher which comprises a horizontally movable plate pushes the cassette from the platform into a discharge hopper. As the pusher returns to its initial position, it actuates means within the input hopper which allows the next cassette in the input hopper to drop from the hopper onto the cassette platform where it is subsequently lowered onto the tape recorder. The pusher moves horizontally in guide slots disposed through the side plates of the changer. The vertically movable cassette platform moves within vertical slots disposed through the same side plates. The magnetic transducer or heads and idler wheel of the reader are mounted on a movable plate which slides into engagement with the cassette when it is being played and away from engagement with a cassette when a cassette is being changed. In one embodiment of the present invention, the cassettes are discharged vertically upward and stacked one beneath the other in the discharge hopper such that the cassettes may be removed from the discharge hopper in the order in which they were placed into the input hopper. The stacking is accomplished by an elevator which lifts each of the cassettes vertically into the discharge hopper beyond a pair of pawls which are disposed within the interior of the hopper.

It is an object of the present invention to provide an automatic cassette changer which is reliable and adaptable for heavy duty application.

It is a further object of the present invention to provide a cassette changer which handles cassettes on a first in-first out basis; that is, a changer which stacks the cassettes in a discharge hopper such that they may be readily removed from the hopper in the order in which they were placed in the input hopper and played on the tape recorder.

It is still another object of the present invention to provide an automatic cassette changer which is adaptable for being utilized with two discharge hoppers and for providing means for selectively placing cassettes in either discharge hopper.

Still another object of the present invention is to provide an automatic cassette changer adaptable for continuous operation, that is where cassettes may be continually loaded and unloaded without affecting or stopping recorder operation.

DETAILED DESCRIPTION OF THE INVENTION

Figures 1, 2:
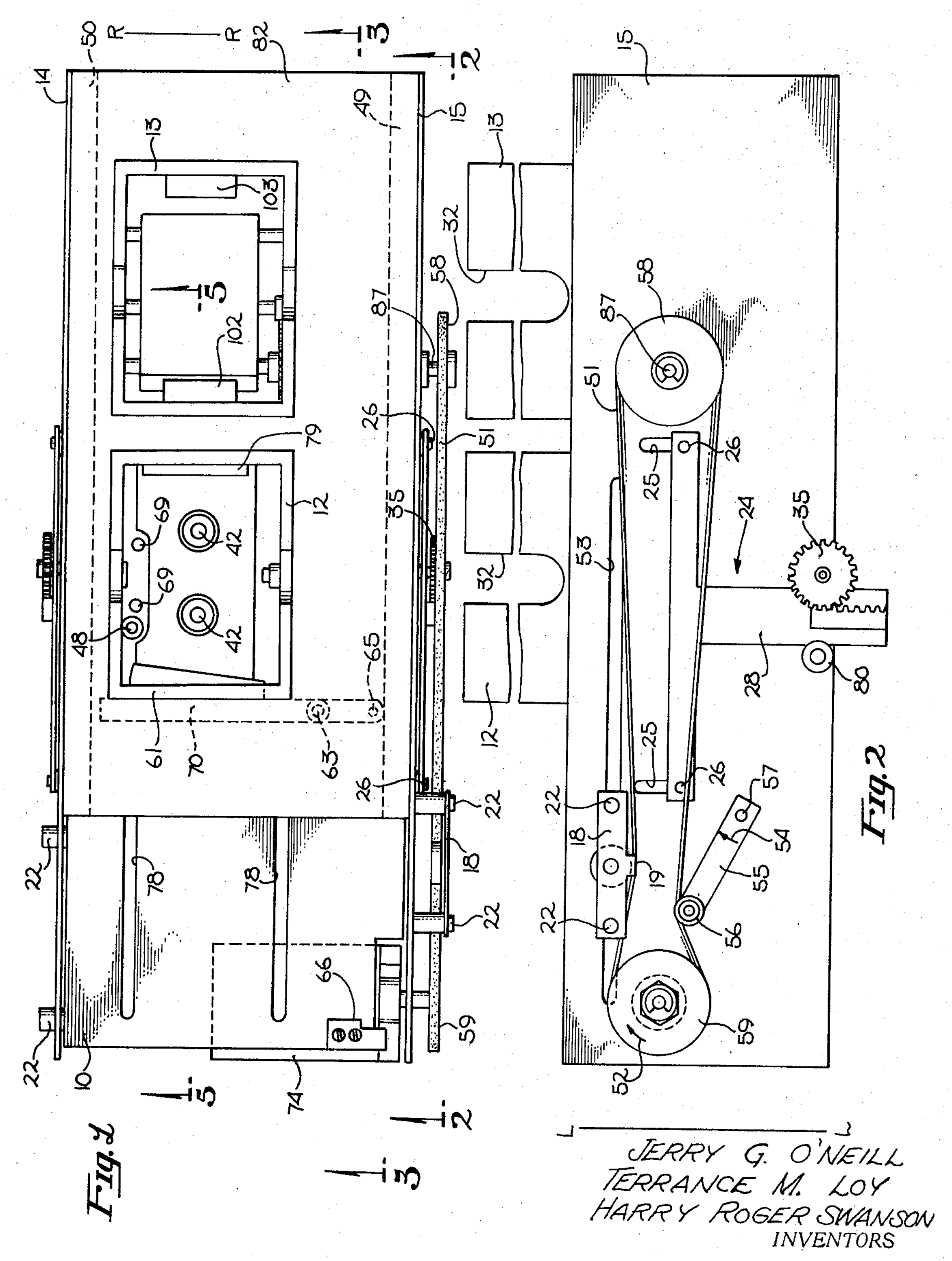
FIG. 1 is a plan view of the automatic cassette changer.
FIG. 2 is a view of a portion of the driving mechanisms for the pusher and cassette platform taken through section line 2—2 of FIG. 1.

With reference to FIGS. 1 through 4, the automatic cassette changer comprises an input hopper 12, a discharge hopper 13, cassette platform 24, pusher 10, a driving mechanism for the pusher illustrated in FIG. 2, an elevator 20 for lifting cassettes into the discharge hopper 13 and a housing 15. The cassettes are successively lowered one at a time from input hopper 12 by means of the movable cassette platform 24 onto tape recorder 11. After a cassette has been played, platform 24 lifts the cassette from the mechanisms which are part of the tape recorder 11 into the horizontal path of the pusher 10. The pusher 10 moves from its position illustrated in FIG. 1 to the right, pushing the cassette from platform 24 onto elevator 20. (Note that the direction "to the right" is indicated by lines R—R in the drawing, and the direction "to the left" is indicated by lines L—L). Elevator 20 lifts the cassette individually into the discharge hopper 13. A movable blade 61 allows the next, and only the next, cassette in the input hopper to drop onto platform 24 so that it may be lowered onto tape recorder 11.

Figure 5:
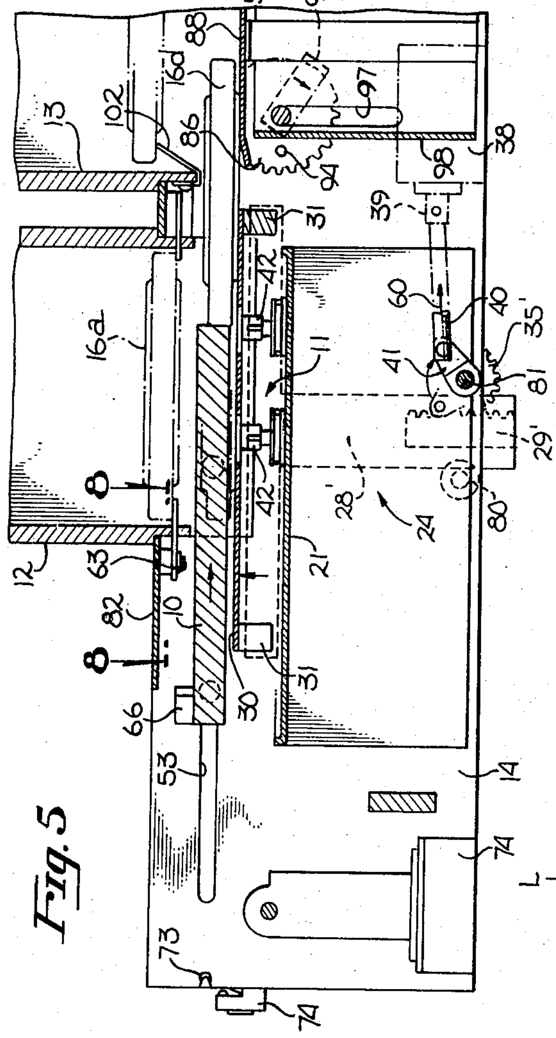
FIG. 5 is a partial cross-sectional view of the changer wherein the pusher is engaging a cassette taken through section line 5—5 of FIG. 1.

While the present invention is described in conjunction with a reel to reel cassette such as cassette 16a of FIG. 5, it is readily apparent that the cassette changer described herein can be utilized with other types of cassettes and magazines; for example, for cassettes having a single reel.

The words "tape recorder" as used herein, include such devices as means for recording signals on a magnetic tape, means for playing back signals recorded on a magnetic tape and means for erasing magnetic tapes. Thus, the cassette changer which successively places and removes cassettes onto and from tape recorder 11 may be utilized where information is to be recorded on, read or erased from magnetic tapes contained within the cassettes or magazines.

The various elements which comprise the cassette changer are held in their respective positions within the changer housing which comprises side plates 14 and 15, ribs 49 and 50, cross supports 75 and 76, and plate 82, illustrated in FIGS. 1 through 6. The vertically mounted side plates 14 and 15 comprise rectangular plates held parallel to one another by cross supports 75 and 76. A flat metal plate 82 is disposed horizontally between the upper edges of the side plates 14 and 15. Apertures are disposed through plate 82 for the input hopper 12 and discharge hopper 13. Ribs 49 and 50 are connected between the upper ends of side plates 14 and 15 and the lower surface of plate 82. The side plates 14 and 15, cross supports 75 and 76, ribs 49 and 50 and the plate 82 may be ordinary metal parts manufactured and assembled utilizing commonly known techniques.

A pair of vertical guide slots 25, clearly illustrated in FIG. 2, are disposed through each of the side plates 14 and 15. These guide slots define the path of vertical movement of the cassette platform 24. A horizontal guide slot 53 is disposed through and defined by each of the side plates 14 and 15. Guide slots 53 define the path of movement of the pusher 10 in a horizontal direction.

Figures 3, 4, 8:
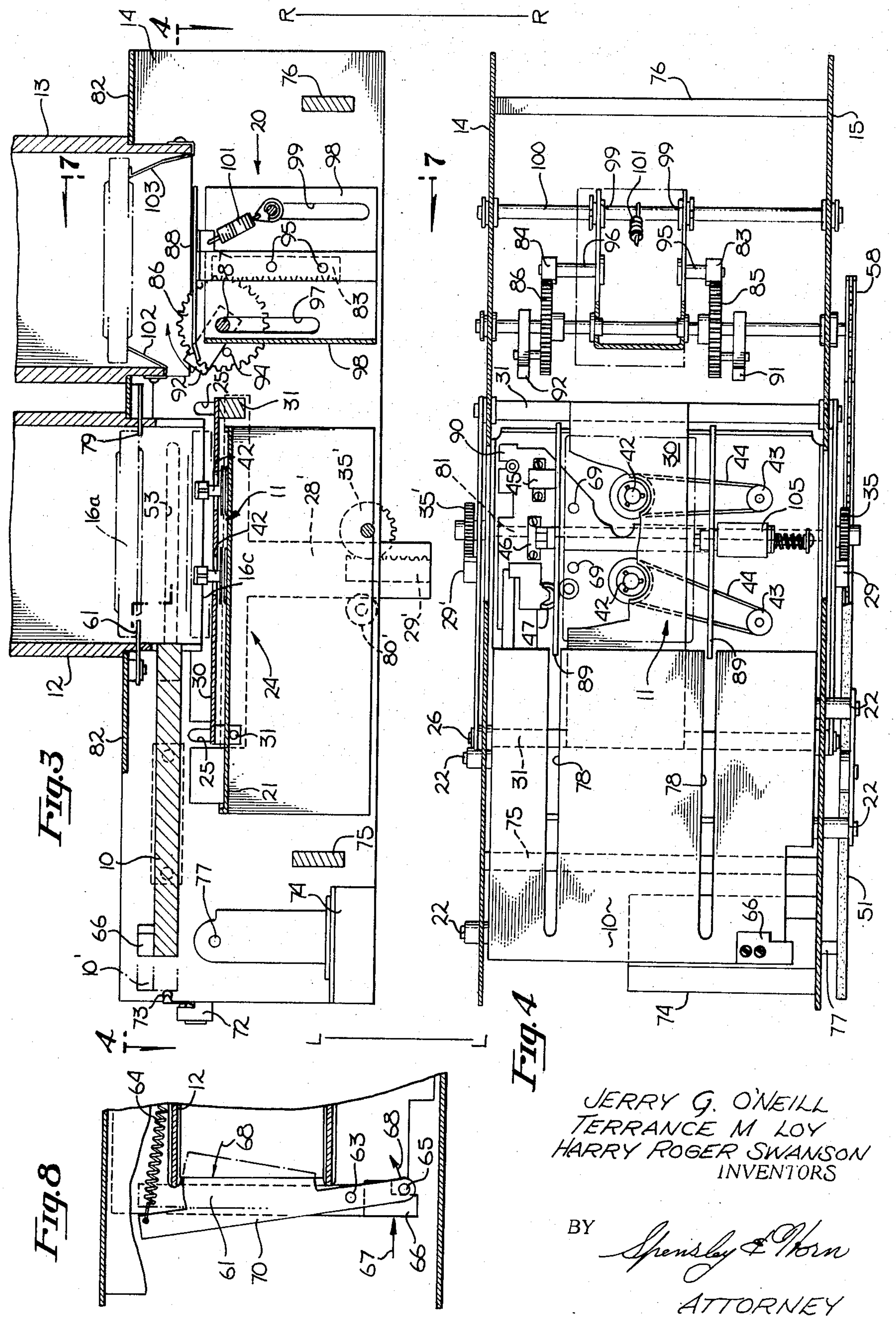
FIG. 3 is a corss-sectional view of the changer taken through section line 3—3 of FIG. 1.
FIG. 4 is a cross-sectional view of the changer taken through section line 4—4 of FIG. 3 and wherein a partial cut-away of the cassette platform is illustrated.
FIG. 8 is a partial cross-sectional view of the blade mechanism which is disposed within the input hopper taken through section line 8—8 of FIG. 5.

The tape recorder 11, onto which and from which the cassettes are placed and removed, is coupled to tape deck 21 which is disposed between the side plates 14 and 15 in a horizontal plane. It is obvious that many different commercially available tape recorder means may be utilized in conjunction with the cassette changer disclosed herein, particularly those where the recorder head moves into and out of engagement with the cassette when a cassette is loaded and removed from the changer. The various components normally associated with a tape recorder are illustrated in FIG. 4. The tape drive shafts 42 which engage the reels of a cassette are illustrated coupled to the tape deck 21. These shafts are driven by pulleys 43 which are coupled to shafts 42 by means of belts 44. A pair of vertical guide pins 69 illustrated in FIGS. 1 and 4 are rigidly coupled to tape deck 21 and are adaptable for engaging apertures normally disposed through a cassette and assist in aligning the cassette with the capstan 48 and drive shafts 42. A pair of guide strips 89, each comprising an elongated rectangular strip, are disposed on opposite sides of tape deck 21. These strips provide additional guidance to assist in aligning a cassette as it is lowered onto tape recorder 11. The strips may be made of ordinary metal parts rigidly coupled to tape recorder 11.

The magnetic transducers or heads 45 and 46 of recorder 11 and idler wheel 47 are mounted on a movable plate 90 (FIG. 4). This is done so that the heads 45 and 46 and wheel 47 may be moved away from a cassette engaging recorder 11 when the cassette is to be changed and subsequently brought into contact with a cassette when the next cassette has been lowered onto the recorder 11. The plate 90 is connected to a solenoid 105 which is adaptable for moving the plate 90. The placement of the heads 45 and 46 and idler wheel 47 onto plate 90 is a modification required to make many standard cassette recorders adaptable for use with the changer.

The cassette platform 24 comprises T-couplers 28 and 28', racks 29 and 29', plate 30, cross bars 31, guide pins 26, guides 80 and 80', spur gears 35 and 35', shaft 81, and lever arm 41, seen in FIGS. 2, 3 and 5. The driving force for the platform 24 is obtained from solenoid 38 illustrated in FIGS. 5 and 7.

Referring to FIGS. 2, 3, 4 and 5, the plate 30 which may be a rectangular metal plate, is horizontally disposed along guide strips 89 on two of its opposite sides and is rigidly coupled to cross bars 31 at its other two opposite sides. The plate 30 is adaptable for being disposed between the tape deck 21 and a cassette engaging tape recorder 11. Plate 30 contains a plurality of apertures which allow the drive shaft 42, guide pins 69 and capstan 48 to pass through plate 30. Thus, plate 30 is able to rest on tape deck 21, when a cassette is engaging and being played on tape recorder 11. The cross bars 31 are ordinary metal bars having a rectangular cross-section and are disposed between opposite guide slots 25 of plates 14 and 15. The ends of each of the bars 31 contain pins 26 which are adaptable for movement within the guide slots 25. The T-couplers 28 and 28' are flat metal members having the general shape of a T. T-couplers 28 and 28' are each coupled at the ends of the upper part of the T to one end of cross bars 31 by means of guide pins 26. T-coupler 28 is disposed parallel to the surface of the side plate 15 exterior to tape recorder 11. T-coupler 28' is likewise disposed parallel to the surface of side plate 14 exterior to tape recorder 11. A rack 29 is rigidly coupled to the lower end of T-coupler 28 and a rack 29' is rigidly coupled to the lower end of T-coupler 28'.

Shaft 81, an elongated cylindrical member, is disposed between and mounted to side plates 14 and 15 and is adaptable for rotating relative to the side plates. Spur gears 35 and 35' are non-rotatably coupled to opposite ends of shaft 81 and are adaptable for cooperatively engaging racks 29 and 29', respectively. Thus, as shaft 81 rotates, spur gears 35 and 35' likewise rotate, causing racks 29 and 29' to move vertically. This vertical movement of the racks moves the T-couplers 28 and 28' in a vertical direction thereby causing the plate 30 to move vertically. It is obvious that the path of movement of the platform 24 is defined by the guide slots 25 which are disposed through the side plates 14 and 15. A pair of guides 80 and 80' which may be metal or Teflon bushings, rigidly mounted to the side plates 15 and 14, respectively, aid in smoothly guiding the T-couplers 28 and 28', respectively, as the couplers move in a vertical direction.

Figure 7:
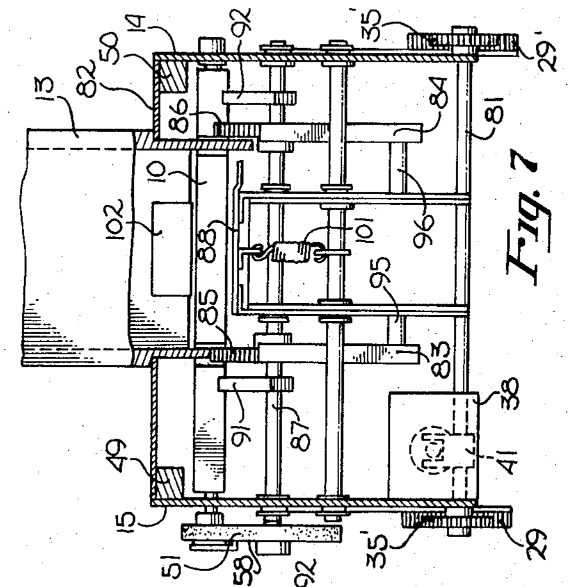
FIG. 7 is a cross-sectional view of the driving mechanism of the dischange hopper elevator taken through section line 7—7 of FIG. 3.

The driving force for the platform 24 is obtained from a solenoid 38 which is rigidly coupled to side plate 15 as is illustrated in FIGS. 5 and 7. The plunger 39 is drawn into the solenoid 38 when a current is applied to the solenoid; without the application of the current the plunger 39 is held extended from the solenoid by a spring housed within the solenoid. The plunger 39 of solenoid 38 is pivotally coupled to one end of lever 41, an ordinary metal lever, by linkage 40. The other end of lever 41 is rigidly coupled to shaft 81. When solenoid 38 is actuated, plunger 39 is drawn into the solenoid causing linkage 40 to move in the direction indicated by arrow 60. This causes shaft 81 to rotate thereby causing the platform 24 to move in a vertical direction within guide slots 25. The platform 24 has two positions, an upper and a lower position. The platform 24 is in its upper position when the solenoid 38 is actuated and in its lower position when the solenoid is not actuated. It should be noted that when the platform 24 is in its upper position, a cassette on the plate 30 of the platform is clear of the mechanism of the tape recorder 11 such as the shafts 42, capstan 48 and pins 69 (FIG. 1) and therefore, can be moved horizontally. When the platform 24 is in its lower position, a cassette on plate 30 is engaging the tape recorder 11 and may be played. The various components which comprise the platform 24 may be ordinary metal parts made utilizing commonly known techniques.

It is obvious that other mechanisms may be used to drive the platform 24, for example, a direct mechanical linkage may be used in place of the gears 35 and rack 29. Also, the motor which drives the pusher 10 may also be used to drive platform 24 instead of solenoid 38.

The pusher 10 comprises a generally rectangular block mounted horizontally within the changer between side plates 14 and 15 as may be readily seen in FIGS. 1, 3 and 4. Guide pins 22 which are rigidly coupled to pusher 10, are disposed through and adaptable for movement within guide slots 53 of side plates 14 and 15. A pair of pins 22 are mounted on each side of the pusher 10 with two of the pins 22 disposed through guide slots 53 of side plates 14 and the other two pins 22 disposed through guide slots 53 of side plate 15. A pair of slots 78 are disposed through the pusher 10 from its upper surface to its lower surface. These guide slots allow the pusher to move towards the right without interfering with guide strips 89. It is readily apparent that pusher 10 is able to move only in a horizontal direction and in a path defined by guide slots 53 of side plates 14 and 15. The path of movement of pusher 10 is such that a cassette 16*d* on plate 30 of platform 24 when the platform is in its upper position will be pushed from plate 30 of platform 24 as shown in FIG. 5. The pusher 10 may be an ordinary metal or plastic part manufactured utilizing commonly known techniques. A contact block 66 which may be an ordinary metal or plastic block is rigidly coupled to the upper surface of pusher 10 in one corner of pusher 10. The block 66 is adaptable for contacting a pin 65 which is disposed beneath and coupled to lever arm 70 when the pusher 10 is in its extreme right position (FIGS. 1 and 8).

Referring to FIG. 2, the driving mechanism for the pusher 10 is illustrated coupled to the surface of side plate 15 opposite the tape recorder 11. The driving force for the pusher is obtained from drive pulley 59 which is coupled to motor 74 through drive shaft 77 (FIG. 3). Pulley 58 is non-rotatably coupled to shaft 87 and is driven by belt 51 which interconnects drive pulley 59 and pulley 58. Both pulleys 58 and 59 are adaptable for cooperatively engaging belt 51 such that no relative motion occurs between the surface of the pulleys engaging the belt and the contacting surface of the belt 51. A drive bar 18 which is disposed between and coupled to pins 22 is connected to one end of belt 51 at point 19. The belt 51 encircles pulley 58, then engages tensioning wheel 56, encircles drive pulley 59 and then is connected to point 19 at its other end.

A tensioning means comprising a tensioning bar 55 which is pivotally coupled at one end to side plates 15 at point 57 and a tensioning wheel 56 which is freely rotatable on the other end of tensioning bar 55 is utilized to keep a constant tension in belt 51. A spring, not illustrated, applies a force on tensioning bar 55, urging it in the direction indicated by arrow 54. Thus, tensioning wheel 56 applies a continuous pressure on belt 51 and tends to keep a constant tension within the belt.

The input hopper 12 illustrated in FIGS. 1, 2 and 3, is an elongated member having a generally rectangular cross-section and adaptable for containing a plurality of cassettes. The hopper 12 which may be an ordinary plastic or metal member is rigidly coupled to plate 82 directly above tape recorder 11, such that cassettes in the hopper are aligned to cooperatively engage tape recorder 11 when a cassette is dropped from the lower end of the hopper. A pair of openings 32 are disposed through opposite walls of the hopper 12. Openings 32 allow easy manual access to the interior of the input hopper 12, thus allowing cassettes to be readily placed within the hopper 12.

Referring to FIGS. 1, 3, 5 and 8, a pair of blades 61 and 79 which are disposed into the interior of input hopper 12 along opposite lower edges of hopper 12 are utilized to allow a single cassette from the hopper 12 to drop onto pusher 10 and plate 30. Stationary blade 79 which is rigidly coupled to plate 82 is an ordinary flat, elongated metal strip. Blade 61 which may be similar to blade 79 is rigidly coupled to lever arm 70. Lever arm 70, an elongated member, is pivotally coupled to plate 82 at point 63 (FIG. 8). A pin 65 which is rigidly coupled to the end of lever arm 70 opposite blade 61 is disposed beneath the lever arm 70 and in the path of contact block 66 of pusher 10. A spring 64 is coupled between the other end of arm 70 and plate 82. Spring 64 urges blade 61 to remain within the interior of hopppr 12. As will be more fully explained, when contact block 66 engages pin 65, blade 61 is caused to rotate about point 63, allowing a single cassette from hopper 12 to leave the hopper and eventually engage the tape recorder 11.

Figure 6:
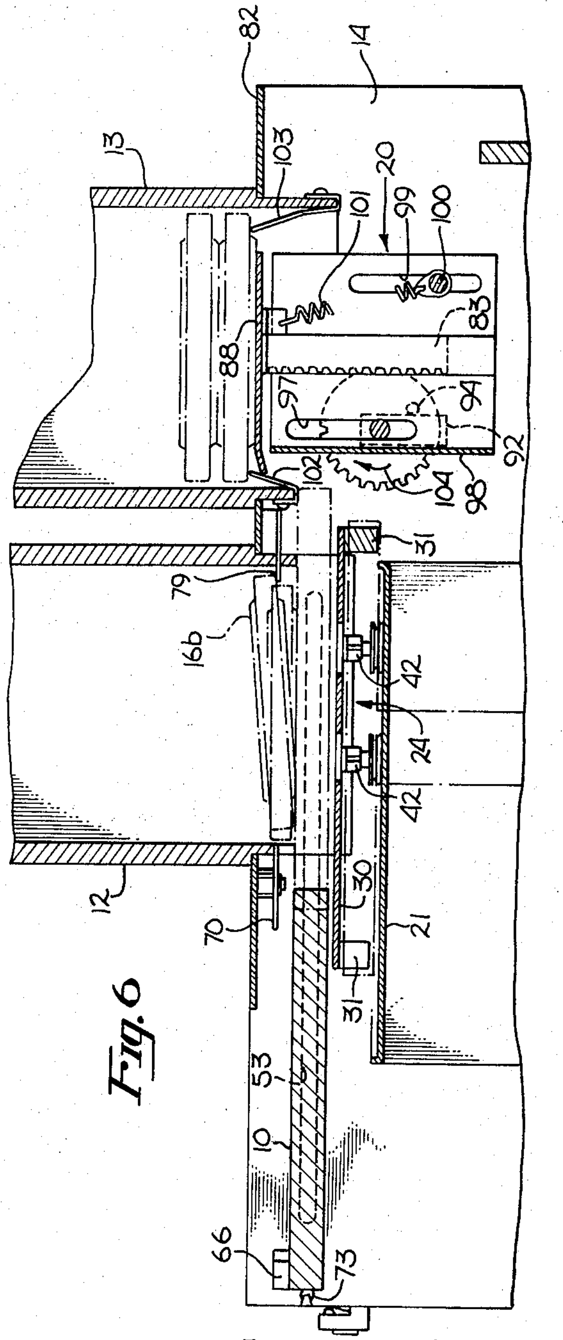
FIG. 6 is a cross-sectional view of the changer taken through section line 6—6 of FIG. 4 illustrating the various positions of a cassette between the input hopper and the cassette platform.

Referring to FIGS. 1 and 2, the discharge hopper 13, which may be identical to hopper 12, is rigidly coupled to plate 82 such that its lower end opens upon the path of a cassette being pushed by pusher 10. Referring to FIGS. 1 and 6, a pair of pawls 102 and 103 are coupled to the opposite lower edges to the discharge hopper 13. The pawls may be ordinary metal members which extend into the interior of hopper 13 and which are adaptable for allowing a cassette to move upward into discharge hopper 13 but which also prevent a cassette from moving downward past the pawls 102 and 103.

As the cassettes are urged from cassette platform 24 by pusher 10, they are pushed onto platform 88 of elevator 20. Elevator 20 then lifts the cassettes one at a time into discharge hopper 13 beyond pawls 102 and 103 so that the pawls 102 and 103 then hold the cassette and prevent it from returning to platform 88.

Referring to FIGS. 3, 4, 6 and 7, the elevator platform 88 comprises a rectangular plate rigidly coupled to the upper edge of the U-shaped elevator frame 98 (FIG. 4). Platform 88 is adaptable for freely moving within the interior of hopper 13. The elongated U-shaped frame 98 is mounted within elevator 20 such that the opening in the U faces cross support 76 and with frame 98 being parallel to side plates 14 and 15. A rack 83 which is disposed vertically along one side of the frame 98 is rigidly held to the frame by means of support bars 95. A rack 84 which may be identical to rack 83 is disposed vertically along the opposite side of frame 98 and is rigidly held to the frame by means of support bars 96. A pair of vertical slots 97 are disposed through the opposite sides of frame 98 and allow shaft 87 to freely pass through frame 98 and allow the frame 98 to move freely vertically without interfering with the rotation of the shaft 87. A pair of slots 99 are also disposed through the opposite walls of frame 98 and allow spring support member 100 to freely pass through frame 98 and also allow the frame 98 to move vertically relative to member 100 without interfering with that member.

A shaft 87 which is disposed between side plates 14 and 15 is freely rotatable within the side plates. One end of shaft 87 is fixedly secured to pulley 58 so that shaft 87 turns with pulley 58. A pair of gears 85 and 86 are coupled to shaft 87 and are adaptable for freely turning on shaft 87 independent of the rotation of shaft 87. Gear 86 is adaptable for cooperatively engaging rack 84 and is disposed along shaft 87 such that it engages rack 84. Gear 85 is disposed along shaft 87 so that it engages rack 83; gear 85 is adaptable for cooperatively engaging rack 83. Gear 86 contains a contact pin 94 which is rigidly coupled to gear 86 parallel to the axis of the gear and is disposed towards side plate 14. Likewise, the gear 85 contains a contact pin 93 which is rigidly coupled to gear 84 parallel to the axis of the gear and is disposed towards side plate 15. A contact bar 92 is rigidly coupled to shaft 87 and is disposed along the shaft such that it will contact pin 94 of gear 86 as shaft 87 rotates. Likewise, the contact bar 91 is rigidly coupled to shaft 87 and is disposed along shaft 87 so that it contacts contact pin 93 as shaft 87 rotates.

The spring support member 100 which comprises an elongated bar is rigidly coupled to and disposed between side plates 14 and 15. A spring 101 is coupled between the lower surface of platform 88 and member 100. Spring 100 applies tension to the elevator 20 and tends to keep the elevator in its lower position as illustrated in FIG. 3.

With reference first to FIG. 2, the operation of the cassette changer illustrated in FIGS. 1 through 8 may be readily understood. The cassettes which are to be played on the tape recorder 11 are placed within the input hopper 12, such as cassette **16*a* of FIG. 5, in a predetermined alignment such that the cassettes are aligned with the mechanisms of tape recorder 11 illustrated in FIG. 4. For example, the cassette should be placed within the hopper 12 such that the aperture in the cassette provided for the guide pins 69 and capstan 48 are aligned with the capstan 48 and guide pins 69 of tape recorder 11.**

A single cycle of the changer will be explained wherein a cassette is removed from tape recorder 11 and placed within discharge hopper 13 and where the next successive cassette from input hopper 12 is lowered to the tape deck 11. The explanation contained herein will begin with the assumption that a cassette is engaging the tape recorder 11 such as cassette **16*c* of FIG. 3 illustrated engaging the tape recorder 11. In this position it is evident that the tape recorder 11 may operate upon the cassette 16*c* and that information may be played back from or recorded on the magnetic tape contained within cassette 16*c*. Note that when the cassette is engaging the tape recorder 11, the cassette platform 24 is in its lower position and that the pusher 10 is in its extreme left position indicated in FIG. 3 by pusher 10'**.

When it is desired to change the cassette, motor 74 of FIG. 3 is actuated, causing pulley 59 of FIG. 2 to begin rotating in the direction indicated by arrow 52. As this occurs, drive bar 81 will be moved towards the right and the pusher 10 will move in the path defined by guide slot 52. With reference to FIG. 3, as pusher 10 moves from its extreme left position, indicated by pusher 10', the pusher disengages actuating arm 73 of limit switch 72. Limit switch 72 which may be an ordinary electrical switch is coupled to the housing of the changer and is actuated whenever pusher 10 moves from its extreme left position. Switch 72 is utilized to actuate solenoid 38 of FIG. 5. Thus, as pusher 10 begins moving to the right, solenoid 38 of FIG. 5 is activated drawing plunger 39 into the solenoid. When this occurs, linkage 40 moves in the direction indicated by arrow 60 thus causing the cassette platform 24 to move to its upper position within the guide slots 25. As previously mentioned, when the cassette platform lifts the cassette from tape deck 11, it is lifted far enough above the tape recorder 11 such that the cassette is made to disengage all the mechanisms associated with tape recorder 11 such as the shafts 42, capstan 48 and guide pins 69. As the pusher 10 continues along guide slots 52 towards the right, it pushes the cassette onto platform 88 as illustrated by cassette 16d in FIG. 5. The pusher continues pushing the cassette until the cassette is completely pushed onto platform 88 of elevator 20.

Solenoid 105 must be activated before platform 24 moves to its upper position moving heads 45 and 46 and idler 47 away from a cassette engaging recorder 11 so that they do not interfere with the movement of a cassette on platform 24. Solenoid 105 may be activated by switch 72. Note that while in the presently preferred embodiment the heads and idler wheel are moved towards and away from the recorder 11, it is possible to move the recorder towards and away from stationary heads and idler wheel.

Referring to FIG. 8, as the pusher 10 moves into its extreme right position (moving in the direction of arrow 67 in FIG. 8), contact block 66 engages pin 65 of lever arm 70. When this occurs, the lever arm rotates in the direction indicated by arrows 68, thereby removing blades 61 from the interior of the input hopper 12. This allows the next cassette in the hopper to fall from the hopper onto the upper surface of the pusher 10. (Note that while blade 79 is illustrated as being stationary, blade 79 may be a movable blade such as blade 61 and may be activated in the same manner as blade 61).

When the pusher 10 reaches its extreme right position, it begins moving towards the left. Known means not illustrated may be utilized to reverse the direction of movement of pusher 10. For example, a limit switch may be placed along the path of pusher 10 such that the switch is activated when the pusher reaches its extreme right position, thereby causing motor 74 in FIG. 5 to reverse its direction. Commonly known gear trains which would reverse the direction of pusher 10 when the pusher reaches its extreme right position may also be utilized in this application.

With reference to FIG. 6, cassette 16b is illustrated as it is leaving hopper 12 and engaging plate 30 of cassette platform 24. As the pusher 10 returns to its extreme left position, the cassette 16*b* falls from the pusher onto the plate 30. Note that only a single cassette from hopper 12 is able to leave the hopper since the distance between the top surface of the pusher 10 and the bottom of cassette 12 is only great enough to allow a single cassette to leave the hopper when the lever arm 70 is actuated by contact block 66. When the pusher 10 again engages the actuating arm 73 of limit switch 74, the solenoid 38 of FIG. 5 is de-activated, causing the platform 24 to move to its lower position. As this occurs, the cassette on plate 30 will cooperatively engage the tape recorder 11. The guide tabs 89 and guide pin 69 assist in aligning the cassette and assure that the cassette cooperatively engages the tape recorder 11. It will be obvious to one skilled in the art that numerous other mechanisms may be utilized to allow a single cassette to drop from hopper 12.

The elevator 20 is also driven by motor 74 of FIG. 3 and cooperatively moves when pusher 10 is activated. When pusher 10 is in its extreme left position, as illustrated in FIG. 6, the elevator 20 is in its upper position. A cassette on platform 88 such as cassette 16*c*, is held within discharge hopper 13 beyond pawls 102 and 103 when the elevator 20 is in its upper position. Note that in this position, contact bars 91 and 92 are engaging contact pins 93 and 94, respectively. As the pusher 10 begins moving towards the right, shaft 87 will be forced to rotate in the direction indicated by arrow 104. As this occurs, contact bars 91 and 92 will be driven away from contact pins 93 and 94 and spring 101 will begin pulling the elevator 20 into its lower position. As the pusher 10 continues in its movement towards the right, the platform 88 becomes part of the path upon which a cassette is pushed. Referring to FIG. 5, cassette 16*d* is illustrated as it is being pushed onto platform 88. Note that in this position, the contact bar 92 is not engaging the contact pin 94 and that the platform 88 is not in motion. As the pusher returns to its extreme left position and shaft 87 rotates in the direction opposite to arrow 104 of FIG. 6, the bars 91 and 92 again engage contact pins 93 and 94, forcing the gears 85 and 86 to rotate and causing racks 83 and 84, respectively, to be forced upward. When this occurs, the platform 88 is lifted again and a cassette on the platform is forced beyond pawls 102 and 103 and hence, prevented from returning towards platform 88. Thus, the cassettes are stacked with hopper 13 in the order in which they are removed from the tape recorder 11 with each successively removed cassette placed beneath the previously removed cassette, that is the cassettes are handled on a first in-first out basis.

If the changer is to be used in a data processing system other modifications to the recorder 11 may be required. For example, mechanisms for causing the recorder to search for particular information on the tape may be necessary or it may be advantageous to move the tape in a cassette incrementally. A mechanism for indexing or incrementally moving a magnetic tape is described in copending application Ser. No. 878,633, filed Nov. 21, 1969, now U.S. Pat. No. 3,602,415.

Means not illustrated may be utilized to begin the movement of pusher 10. For example, a signal may be recorded on the magnetic tape within a cassette indicating when the magnetic tape is completed. This signal may be processed through commonly known circuitry to activate motor 74. Other means such as means to detect the end of the tape on a reel by sensing the slippage in the clutches that drive shafts 42 may also be utilized to actuate pusher 10.

Figure 9:
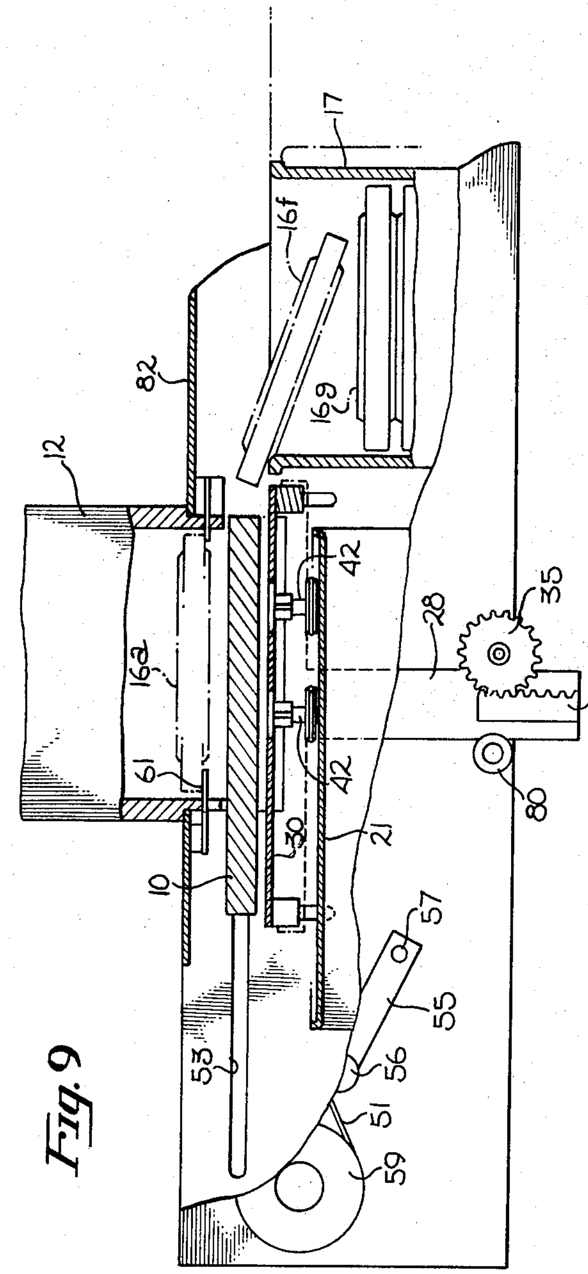
FIG. 9 is a partial cut-away view of the changer wherein an alternate discharge hopper is illustrated.
Figure 11:
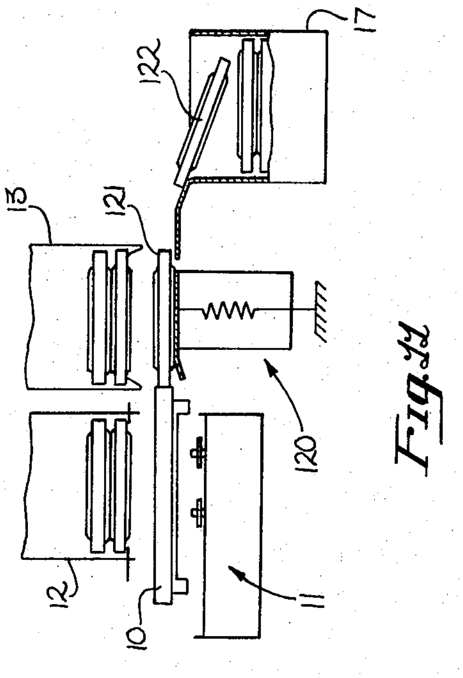
FIG. 11 is a schematic view of an alternate embodiment of the present invention wherein a second discharge hopper is located along the path of movement of the pusher.
Figure 10:
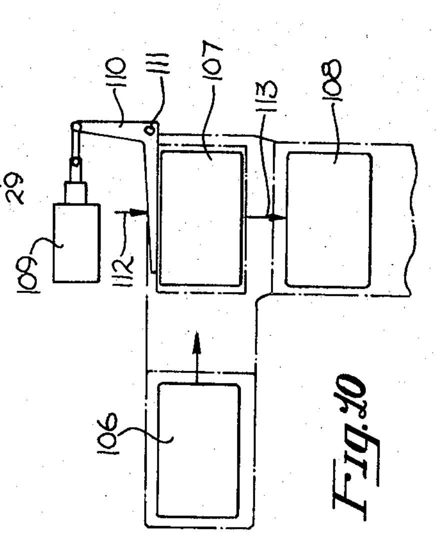
FIG. 10 is a schematic view of an alternate embodiment of the present invention wherein a second dischange hopper is located adjacent to the path of movement of the pusher.

Referring to FIGS. 9, 10 and 11, various alternate embodiments of the present invention are disclosed. In FIG. 9, an alternate embodiment of the changer is disclosed wherein an alternate discharge hopper 17 is utilized in place of the previously discussed discharge hopper 13. In FIG. 9, the discharge hopper 17 which may be substantially similar to discharge hopper 13 of FIGS. 1 through 8, is illustrated coupled to the housing of the changer. The remainder of the changer illustrated in FIG. 9 may be substantially similar to the changer of FIG. 1 through 8 except that no elevator 20 is utilized in this embodiment. The upper edges of the discharge hopper 17 are located along the horizontal path of a cassette being pushed by a pusher 10, while the main body of hopper 17 is below the path. Pusher 10 pushes the cassette from plate 30 and the cassette falls into discharge hopper 17 as illustrated by cassettes 16*f* and 16*g*. Thus, in this embodiment the discharge hopper does not require an elevator. As is obvious, the cassettes cannot readily be removed from hopper 17 in the order in which they are dropped into the discharge hopper.

In FIGS. 10 and 11, two additional embodiments of the present invention are disclosed wherein two discharge hoppers are utilized with each embodiment. In FIG. 10, dischage hoppers 107 and 108 are illustrated. The changer previously described in conjunction with FIGS. 1 through 8 may be utilized with several minor changes for the embodiment illustrated in FIG. 10. Only the input hopper 106 which may be similar to the previously described input hopper 12 and the discharge hopper 107 which may be similar to the discharge hopper 13 of the changer illustrated in FIGS. 1 through 8 are illustrated in FIG. 10 for the sake of clarity. Discharge hopper 108 may be similar to discharge hopper 17 of FIG. 9. Hopper 107 is located adjacent to the path of a cassette being pushed by the pusher. One change required to utilize this embodiment is that the elevator 20 of the embodiment of FIGS. 1 through 8 be adaptable for movement independent of the pusher 10. That is, are be provided for driving elevator 20 independent of the pusher 10. Commonly known electrical or mechanical means may be used; for example, an electric motor may be used to drive shaft 87 independently of pulley 58 (FIG. 2). Thus, when a cassette is pushed beneath hopper 107, it may be selectively lifted into discharge hopper 107 by the elevator or it may be alternatively left on the elevator. A solenoid 109 is utilized to activate the L-shaped lever arm 110 which is pivotally coupled at point 111 to the changer. When the solenoid is operated, lever arm 110 moves in the direction indicated by arrow 112. As this occurs, a cassette beneath hopper 107 is urged in the direction indicated by arrow 113 and forced into discharge hopper 108. Thus, by utilizing this embodiment, a cassette which is removed from the tape recorder may be selectively placed within discharge hopper 107 or 108. This is accomplished by controlling the movement of the elevator which if actuated, places a cassette in hopper 107 and alternativerly by not actuating the elevator and by actuating solenoid 109, a cassette may be placed into hopper 108. In numerous commerical application, it may be desired to selectively place cassettes into two different discharge hoppers.

FIG. 11 illustrates still another embodiment wherein two separate discharge hoppers are utilized. The changer in this embodiment may be similar to the changer of FIGS. 1 through 8 with a few modifications. The tape recorder 11 is illustrated along with the pusher 10, input hopper 12 and discharge hoppers 13 and 17. These components may be similar to the same numbered components previously described in conjunction with FIGS. 1 through 9. Elevator 120 is adaptable for movement independent of pusher 10 and may alternatively remain in the position illustrated or lift a cassette such as cassette 121 into discharge hopper 13. Thus, the elevator 120 of this embodiment may be similar or identical to the elevator of the changer described in conjunction with FIG. 10. Discharge hopper 17 is positioned along the path of pusher 10 so that it is able to catch a cassette falling from elevator 120. If it is required to place cassette 121 into discharge hopper 17, the elevator 120 remains in the position illustrated. When the next cassette is pushed by pusher 10 onto the elevator 120, cassette 121 will be forced from the elevator 120 and pushed into discharge hopper 17 as illustrated by cassette 122. Thus, in this embodiment, a cassette may be placed in either hopper 13 or 17.

Still another embodiment of the present invention having two discharge hoppers may be constructed using a single elevator to lift cassettes into either of the two hoppers. Wherein each hopper may be similar to hopper 13 of FIGS. 1 through 6. In this embodiment, two hoppers such as hopper 13 are disposed along the path of the pusher with the elevator being adaptable to lift a cassette into either hopper. The pusher is adaptable for selectively pushing a cassette beneath either hopper, thus allowing a cassette to be stacked in either discharge hopper.

An automatic cassette changer has been disclosed which allows cassettes to be placed upon and removed from a tape recorder and where the cassettes removed from the recorder may be stacked successively within a discharge hopper such that each successive cassette removed from the tape recorder is placed beneath the preceding cassette. In addition, the changer disclosed is adaptable for being utilized with at least two discharge hoppers and for allowing cassettes played on the tape recorder to be selectively placed in either discharge hopper.

We claim:

1. An automatic cassette changer for use with a magnetic tape recorder or playback means comprising:

platform means for vertically lowering and lifting a cassette onto and from engagement with said tape recorder or playback means, said means having an upper and lower position and said recorder or playback means being stationarily mounted adjacent the lower position of said platform means;

an input hopper for holding a plurality of cassettes in parallel stacked relationship to said platform means and in vertical alignment with said tape recorder or playback means; said hopper being positioned directly above said platform means such that cassettes from said hopper may engage said platform means and be lowered onto said tape recorder or playback means while only moving in a single direction;

holding means in said hopper including actuating means for supporting the stacked cassettes in said hopper;

pushing means for pushing a cassette in a horizontal path to eject a cassette resting on said platform means in its upper position, wherein said path includes the upper surface of said platform means when said means is in its upper position; and a housing for securing said platform means, said input hopper, said pushing means with a magnetic tape recorder or playback means, said housing defining a pair of parallel guide slots and wherein said pushing means is coupled to said guide slots for movement in said guide slots, said guide slots determining said path of said pushing means;

drive means for driving said platform means and said pushing means in a horizontal path in a timed operative sequence;

said pushing means having a rest position at one side of said hopper and being movable by said drive means and guided by said guide slots to an eject position underlying said stack;

said pushing means being operatively connected wtih said actuating means for releasing a single cassette from said hopper onto said pushing means while said pushing means is within the confines of said hopper and said cassette being automatically positioned onto said platform means when said pushing means is returned to its rest position;

whereby a cassette may be vertically lowered by said drive means for engagement with a tape recorder or playback means.

2. The automatic cassette changer defined in claim 1 including a discharge hopper for containing a plurality of cassettes located along the path of said pushing means such that a cassette pushed from said platform means is urged into said discharge hopper by said pushing means.

3. The automatic cassette changer defined in claim 1 wherein a discharge hopper adaptable for containing a plurality of cassettes is coupled to said housing along the path of said pushing means such that a cassette pushed from said platform means is urged into said hopper by said pushing means.

4. The automatic cassette changer defined in claim 3 including an alternate discharge hopper adaptable for containing a plurality of cassettes located adjacent to said path of said pushing means and means for selectively urging a cassette from said path of said pusher into said alternate discharge hopper.

5. The automatic cassette changer defined in claim 3 wherein said discharge hopper contains means for stacking successive cassettes received by said hopper such that each successive cassette is placed beneath the preceding cassette received by said hopper.

6. The automatic cassette changer defined in claim 5 wherein said stacking means comprises an elevator for lifting cassettes from said path of said pusher into the interior of said discharge hopper and at least two pawls disposed within the interior of said discharge hopper for permitting cassettes on said elevator to pass from said path into said discharge hopper and aaptable for preventing such cassettes from returning to said path.

7. The automatic cassette changer defined in claim 5 including an alternative hopper adaptable for containing a plurality of cassettes located along said path of said pusher and means for selectively preventing the cassettes from being stacked in said discharge hopper such that the next successive cassette pushed by said pushing means urges said preceding cassette into said alternate hopper.

8. The automatic cassette changer defined in claim 1 wherein the magnetic transducer associated with said recorder or playback means are movably coupled to said recorder or playback means.

9. The automatic cassette changer defined in claim 1 including means for selectively removing the magnetic transducer and idler wheel associated with said tape recorder and playback means into and from engagement with a magnetic tape contained within a cassette engaging said tape recorder or playback means.

10. The automatic cassette changer defined in claim 9 wherein said input hopper contains means for selectively causing a single cassette from said hopper to drop from said hopper and engage said cassette platform.

11. The automatic cassette changer defined in claim 10 wherein at least one magnetic head of said magnetic tape recorder or playback means is moveably mounted and is adaptable for being brought in contact with the magnetic tape in a cassette on said cassette platform when said cassette platform is in said lower position.

12. The automatic cassette changer defined in claim 11 wherein said discharge hopper contains means for stacking successive cassettes received by said hopper such that each successive cassette is placed beneath the preceding cassette received by said hopper.

13. The automatic cassette changer defined in claim 12 wherein said stacking means comprises an elevator for lifting cassettes from said path of said pusher into the interior of said discharge hopper and at least two pawls disposed within the interior of said hopper for permitting cassettes on said elevator to pass from said path into said discharge hopper and adaptable for preventing said cassette from returning to said path.

* * * * *